(12) United States Patent
Trifilo

(10) Patent No.: US 6,960,928 B2
(45) Date of Patent: Nov. 1, 2005

(54) ELECTROMAGNETIC COUPLING BASED MOTOR PLUG DETECT SYSTEM AND METHOD

(75) Inventor: Timothy M. Trifilo, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 10/718,737

(22) Filed: Nov. 21, 2003

(65) Prior Publication Data

US 2005/0110514 A1    May 26, 2005

(51) Int. Cl.[7] .................. G01R 27/08; G01R 31/28
(52) U.S. Cl. ......................... 324/772; 324/511
(58) Field of Search ................ 324/772, 546, 324/547, 511, 603; 318/490

(56) References Cited

U.S. PATENT DOCUMENTS

| | | | |
|---|---|---|---|
| 3,932,806 A * | 1/1976 | Kawada ................. 324/546 |
| 3,932,811 A * | 1/1976 | Branch .................. 324/772 |
| 4,335,348 A | 6/1982 | Reed et al. ............. 324/51 |
| 4,507,610 A | 3/1985 | Nakaoka ................ 324/238 |
| 4,973,911 A | 11/1990 | Marshall ................ 324/628 |
| 4,985,857 A * | 1/1991 | Bajpai et al. ........... 702/184 |
| 5,059,912 A | 10/1991 | Trampert ............... 324/546 |
| 5,198,733 A | 3/1993 | Wright .................. 318/254 |
| 5,254,914 A * | 10/1993 | Dunfield et al. ........ 318/254 |
| 5,519,337 A | 5/1996 | Casada ................. 324/772 |
| 5,740,600 A * | 4/1998 | Rasberry ................ 29/596 |
| 5,990,688 A | 11/1999 | Bourgeois et al. ...... 324/545 |
| 6,184,690 B1 | 2/2001 | Fisher et al. ........... 324/546 |
| 6,441,572 B2 * | 8/2002 | Batzel .................. 318/254 |
| 6,483,319 B1 | 11/2002 | Kendig et al. .......... 324/551 |
| 6,549,017 B2 * | 4/2003 | Coffeen ................. 324/547 |
| 6,865,706 B1 * | 3/2005 | Rohrbaugh et al. ...... 714/738 |
| 2002/0113615 A1 * | 8/2002 | Atarashi ................ 324/772 |

\* cited by examiner

*Primary Examiner*—Anjan Deb
(74) *Attorney, Agent, or Firm*—Lily Neff; Cantor Colburn LLP

(57) ABSTRACT

A method and system of detecting the presence of an electric machine attached to a solid state drive using high speed, low energy pulses. The system and method include generating a pulse signal to a selected driven phase winding; and detecting the pulse signal for the purpose of one of a signal presence and absence thereof at a non-driven phase winding as a result of the pulse signal, wherein presence of the signal at the non-driven phase winding is indicative of the motor connected to the electronic control circuit.

25 Claims, 5 Drawing Sheets

ELECTROMAGNETIC COUPLING BASED MOTOR PLUG DETECT SYSTEM AND METHOD

BACKGROUND OF THE INVENTION

The present invention relates generally to electronically commutated DC motors (i.e., brushless DC motors) and, more particularly, to a system and method to detect the presence or absence of a motor connection.

Brushless direct current (BLDC) motors are well known in the art. The phase windings in these motors are sequentially energized at appropriate times so as to produce a rotating magnetic field relative to a permanent magnet rotor. The timing of such energization is a function of where the permanent magnetic rotor is relative to a phase winding that is to be energized. Various means have been heretofore used to sense the position of the permanent magnet rotor relative to the phase windings. These have included optical sensors and Hall effect devices which feed a position signal to switching logic that selectively switches power on and off to the respective phase windings. However, such sensing devices add cost and complexity to a system, and may moreover require maintenance from time to time to assure continued proper operation. In certain high flux/power applications, such as those employing 350 volt motors, the Hall sensors are a common point of failure. As a result of these drawbacks, attention has recently been focused on "sensorless" systems which are not premised on any direct sensing of the rotor position itself. These systems generally attempt to measure the effect of the back electromotive forces produced in the energized windings by a rotating rotor. These systems have achieved various degrees of success in accurately measuring the effect of this back electromotive force.

Traditionally, detection that a motor is connected to drive electronics may be detected in one of two ways. First, sensors may be employed which provide feedback of motor position and motion thereby providing information about the motor being physically connected. However, as discussed above, reliance on such sensors complicate motor design and add cost.

Second, current may be driven through motor windings at a level that is sufficient for the drive electronics to measure. If voltage is increased high enough, and there is no current, a motor is not connected. This is feasible on sensorless systems; however, it takes hundreds of milliseconds to detect the presence of a motor. Additionally, ramping up motor current to a predefined level will almost always cause the motor to move, making starting more difficult. In some applications, it may not be desirable to move the motor by performing such a test. Moreover, current sensing may impose a requirement that custom parameters be used for each motor/drive situation. In cases where a custom parameter is not used, a high power drive could damage a small rotor (e.g., demagnetize).

Current motor drive technology simply attempts to restart a motor infinite times if no motor is plugged or operably connected. This approach is undesirable since it does not provide adequate fault isolation. Instead of being able to differentiate between an unplugged motor and a true start failure (e.g., due to external disturbance), the current approach simply posts start failures until the error stack fills with start failures.

Thus, it is desired to determine if a motor is connected to a solid state motor control assembly to isolate a potential fault without requiring a sensor and significant energy to be delivered to the motor itself.

SUMMARY OF THE INVENTION

The shortcomings of the prior art are overcome and additional advantages are provided through the provision of a method and system of detecting the presence of an electric machine attached to a solid state drive using high speed, low energy pulses. The method includes generating a pulse signal to a selected driven phase winding; and detecting the pulse signal for the purpose of one of a signal presence and absence thereof at a non-driven phase winding as a result of the pulse signal, wherein presence of the signal at the non-driven phase winding is indicative of the motor connected to the electronic control circuit.

The system includes a stator having a plurality of phase windings; and an electronic control circuit configured to generate a pulse signal to a selected driven phase winding. The pulse signal is detected for the purpose of signal presence or absence thereof at a non-driven phase winding as a result of the pulse signal, wherein the presence of the signal at the non-driven phase winding is indicative of the motor connected to the electronic control circuit.

BRIEF DESCRIPTION OF THE DRAWINGS

Referring to the exemplary drawings wherein like elements are numbered alike in the several Figures.

DETAILED DESCRIPTION OF THE INVENTION

Figure 1:
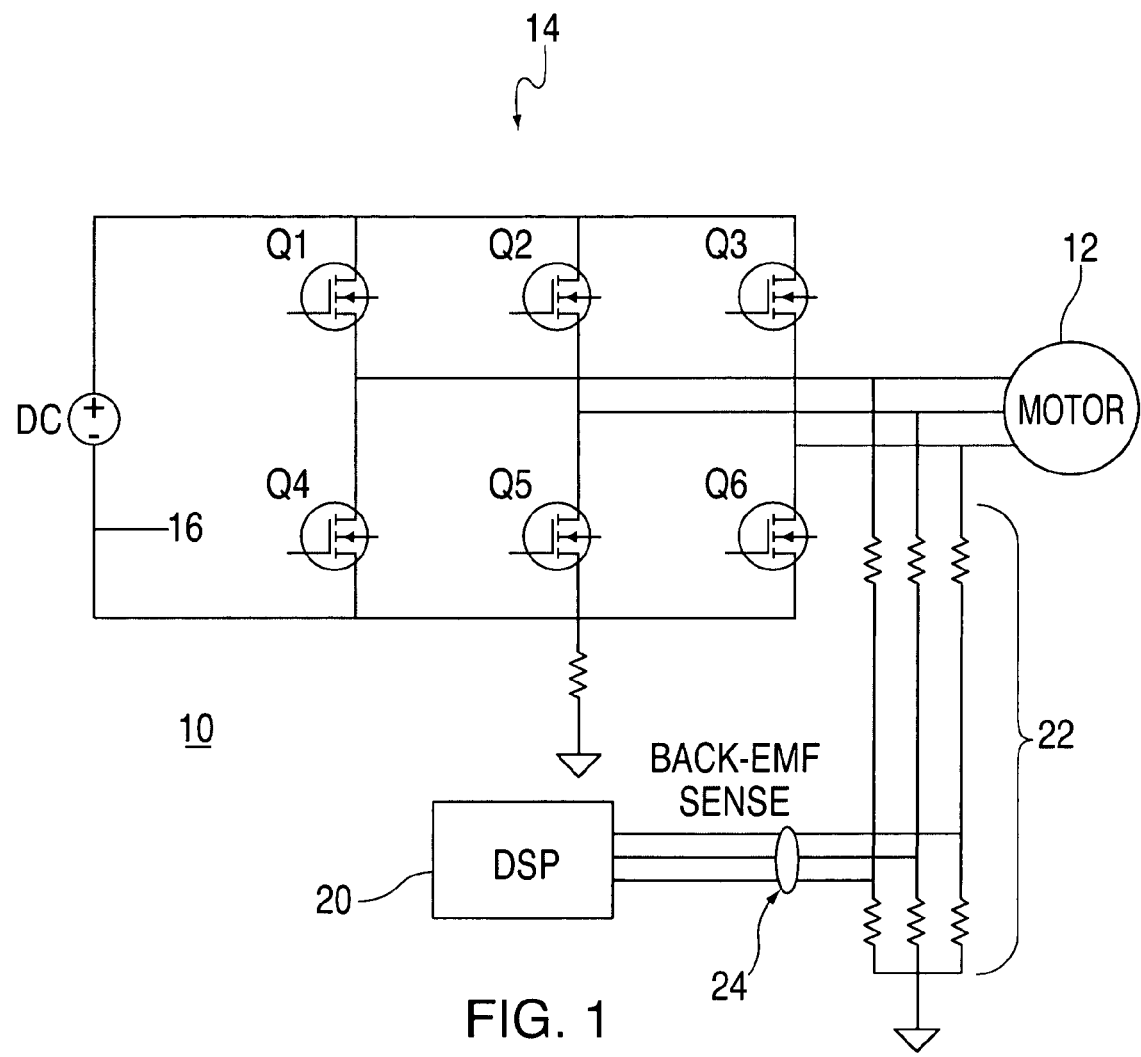
FIG. 1 is a schematic diagram of a control circuit for a sensorless brushless DC motor in operable communication with a three-phase H-bridge configured to maintain consistent phase and device nomenclature in accordance with an exemplary embodiment of the invention.

Referring initially to FIG. 1, there is shown a schematic diagram of an existing control circuit 10 for a sensorless brushless DC motor 12. As is well known in the art, an inverter 14 is used to electronically commutate the phase currents supplied by a DC bus 16 to the motor 12. For a motor having three phase windings, a conventional inverter 14 includes six individually controlled switching devices, designated in FIG. 1 as Q1 through Q6. The switching devices Q1 through Q6 may be transistors, junction transistors, Field Effect transistors (FETs), Metal Oxide Field Effect transistors (MOSFETs), Insulated Gate Bipolar Transistors (IGBTs), Silicon Controlled Rectifiers (SCR), and Triacs solid state relays and the like, as well as combinations including at least one of the foregoing. In the example shown, the switching devices are (MOSFETS); however, other types of solid state switching devices may also be used as discussed above.

Q1, Q2, and Q3 selectively couple each of the three motor phases to the positive side of the DC bus 16, while Q4, Q5, and Q6 selectively couple each of the three motor phases to the negative side of the DC bus 16. Each of the MOSFETS are energized and de-energized in a specific sequence as determined by an appropriate control signal applied to the gate terminals thereof. A controller 20, including a microprocessor (a digital signal processor (DSP) shown), is used to generate these control signals for energization and de-energization of the motor windings.

The controller 20 is employed to develop the correct voltage needed to produce the desired torque, position, and/or speed of the motor 12. In order to perform the prescribed functions and desired processing, as well as the computations therefore (e.g., the control algorithm(s), and the like), the controller 20 may include, but not be limited to, a processor(s), computer(s), memory, storage, register(s), timing, interrupt(s), communication interface(s), and input/output signal interfaces, and the like, as well as combinations comprising at least one of the foregoing. For example, controller 20 may include signal input signal filtering to enable accurate sampling and conversion or acquisitions of such signals from communications interfaces. It should also be appreciated that while in an exemplary embodiment the inverter 14 and controller 20 are described as separate, in some embodiments, it may desirable to have them integrated as a single component as an electronic control circuit. Additional features of controller 20 are thoroughly discussed at a later point herein.

As stated previously, one method for accurately determining the appropriate time for applying control signals to the switching devices in a sensorless system is to monitor the BEMF of the de-energized phase. As shown in FIG. 1, the phase voltages are inputted to the controller 20 after being attenuated to a suitable level for the microprocessor logic. In the example illustrated, a voltage divider 22 attenuates the phase voltages of the motor 12 (having a peak phase voltage of about 450 volts) by about a factor of 130, to result in a peak sensed voltage of about 3.3 volts. Thus, attenuated phase voltage signals 24 are inputted directly into the controller 20.

Figure 2:
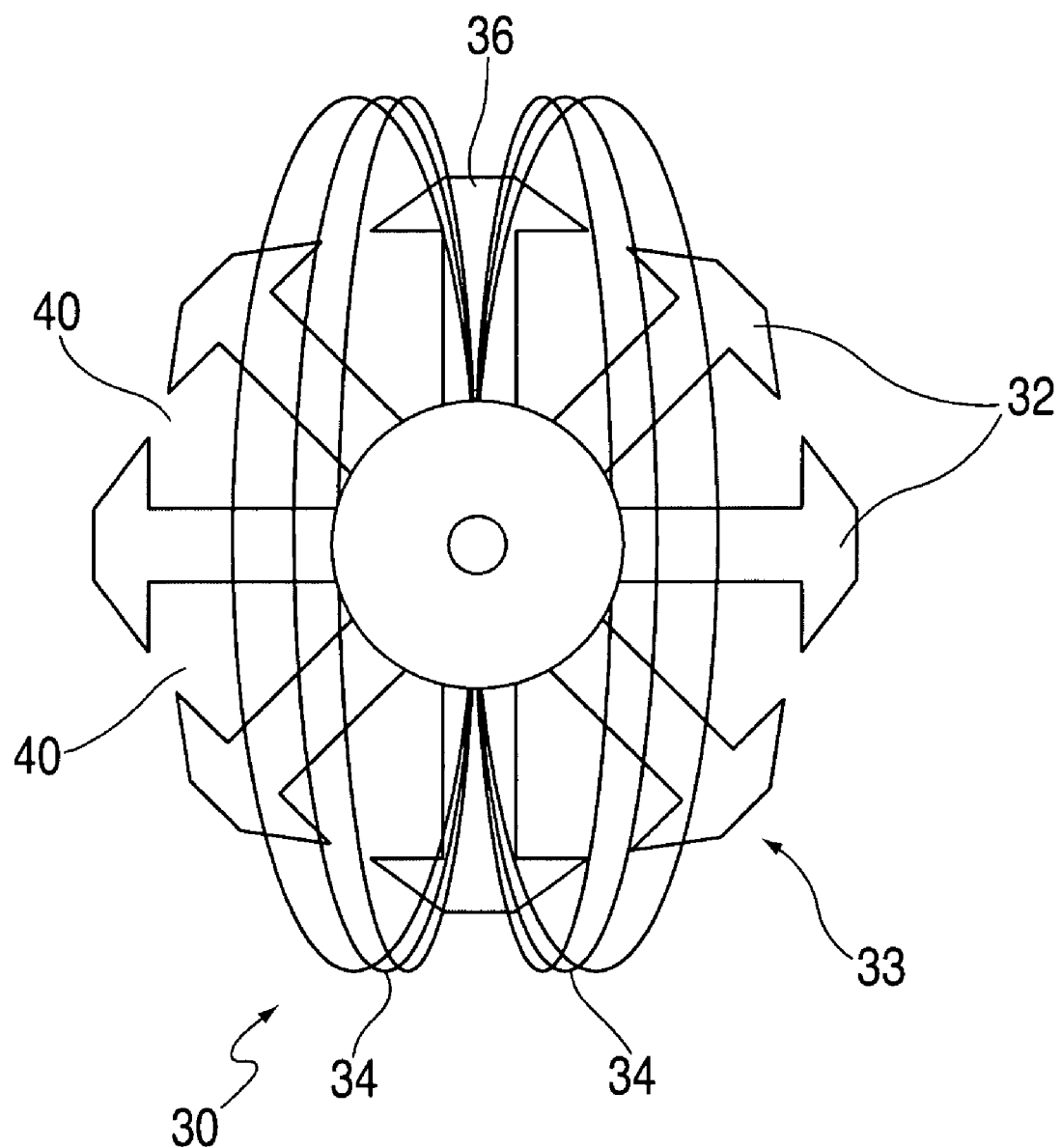
FIG. 2 is a schematic diagram illustrating one example of flux linkage through a motor stator of the motor of FIG. 1.

FIG. 2 is an illustration of a stator 30 from a BLDC motor 12 with eight poles or legs 32, or alternatively, four pole pairs or leg pairs 33. Flux linkage 34 is shown through a single leg pair 36 for illustration corresponding to an energized or driven phase winding 40 surrounding the single leg pair 36. The stator 30 may be made from laminated iron. Typically, each leg 32 is wound with enameled copper wire (generally indicated at 40 between each leg) and connected to other windings 40 depending on a number of factors including wye/delta requirements, phases, and unipolar/bipolar operation. The hub and associated magnets of a rotor (not shown) rotate around the outside of the stator 30 in this type of inverted BLDC motor 12. It can be seen by the flux linkage 34 that the adjacent legs 32 which are wired to other phases will have energy coupled onto them even when they are the de-energized or non-driven windings in a connected motor.

Still referring to FIG. 2, the opportunity for significant flux linkage 34 to electromagnetically couple with adjacent stator legs 32 in the stator 30 allows determination of whether motor 12 is connected in accordance with an exemplary embodiment of the invention. If no motor is connected, all non-driven phases are open, with the exception of some calibrated leakage path to ground, or back-EMF sensing networks. It will be recognized by one skilled in the pertinent art that it is observed that no voltage appears on non-driven phases if the motor 12 is not present to provide a means for energy to electromagnetically couple back to adjacent phases. The motor 12 may not be present due to it not being connected or being connected with faulty motor cables. Alternatively, if a motor is present and plugged with properly working motor cables, voltage appears on non-driven phases as the plugged-in motor provides a means for energy from the driven phase to electromagnetically couple back to adjacent phases.

A detection system for determination of a connected motor 12 may be integrated into a fully functional motor control subsystem with fault detection and recovery capabilities. More specifically, such a detection system and method may be employed with the existing control circuit 10 of FIG. 1 using the existing back-EMF sampler. The back-EMF sensing nets are low impedance, and largely immune to local switching noise in inverter 14. Control circuit 10 may employ a process exemplified in FIG. 3 in accordance with an exemplary embodiment of the invention generally shown at 46 to isolate fault with motor 12 (e.g., plugged or external disturbance).

Figure 3:
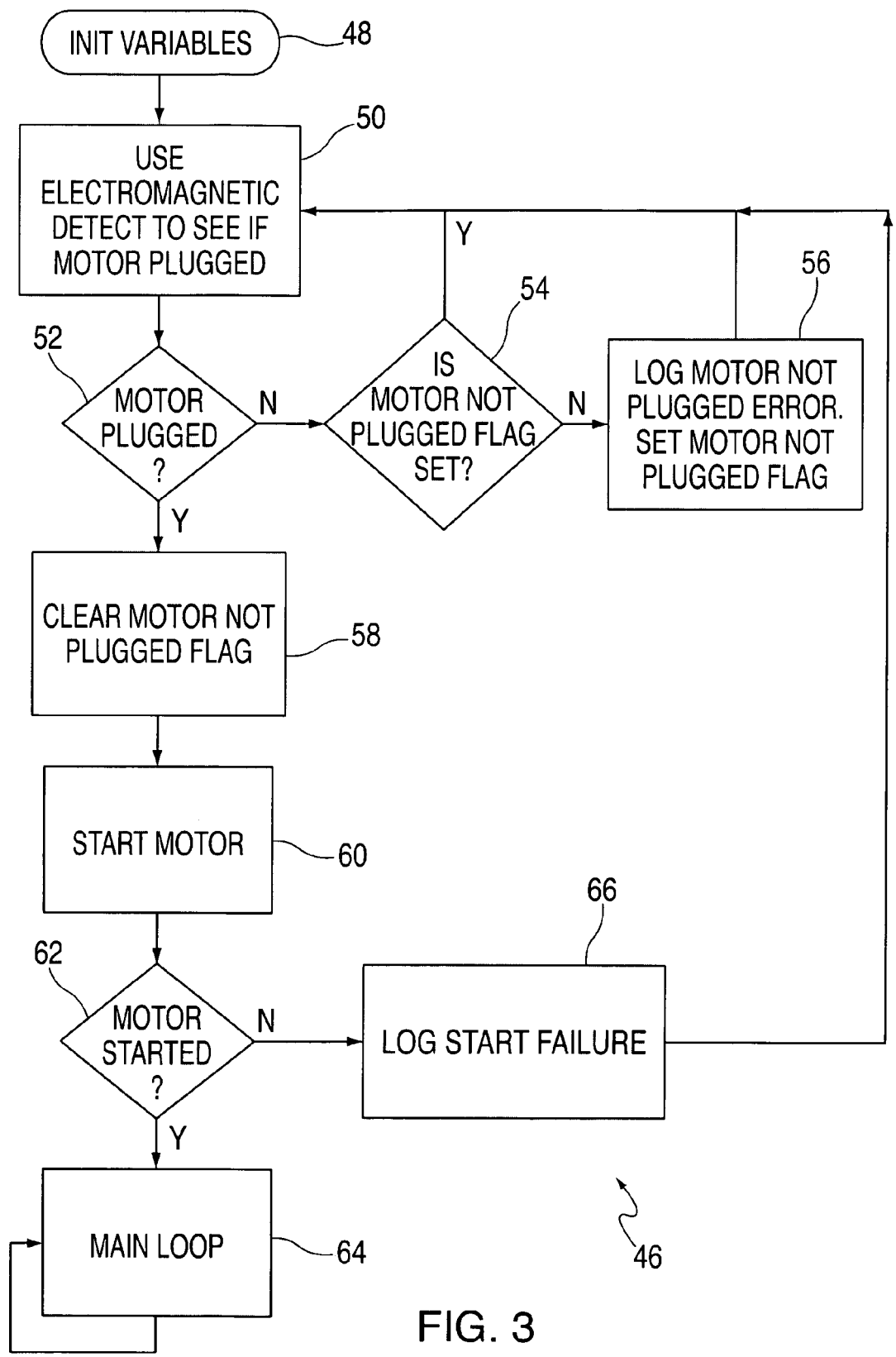
FIG. 3 is a flow chart illustrating an exemplary embodiment of an application code implementation to determine motor disconnect before period re-start attempts can be made.

Referring now to FIG. 3, controller 20 initializes variables at block 48 to execute process 46. At block 50, electromagnetic detection uses signals 24 with respect to the non-driven windings to determine if motor 12 is plugged at block 52. If a controller 20 detects no electromagnetic coupling between the driven winding and the adjacent non-driven windings at block 52, then a motor_not_plugged flag is checked to determine if the motor_not_plugged flag is set at block 54. If set, then block 50, if the flag is not set, then block 56 to log a motor_not_plugged error and set motor_not_plugged flag, then to block 50.

If motor 12 is determined to be plugged at block 52, the motor_not_plugged flag is cleared at block 58 and motor 12 is started at block 60. Starting of motor 12 is determined at block 62, if started, then execute main loop at block 64 for motor control. If motor 12 is not started at block 62, then a start_failure is logged at block 66, then block 50.

The routine described above with respect to blocks 50–58 in process 46 can be added to modify existing code to remedy the situation of flagging infinite motor start failures until the error stack fills with start failures if motor 12 is not plugged in. The above modification (e.g., blocks 50–58) may also help to identify faulty motor cables.

Furthermore, it will be noted that the above routine or flow diagram depicted and described with respect to FIG. 3 herein is just one example, as there may be many variations to the flow diagram or the blocks/steps (or operations) described therein without departing from the spirit of the invention. For instance, the blocks may be performed in a differing order, or steps may be added, deleted or modified. All of these variations are considered a part of the claimed invention. The capabilities of the present invention can be implemented in software, firmware, hardware or some combination thereof.

Figure 4:
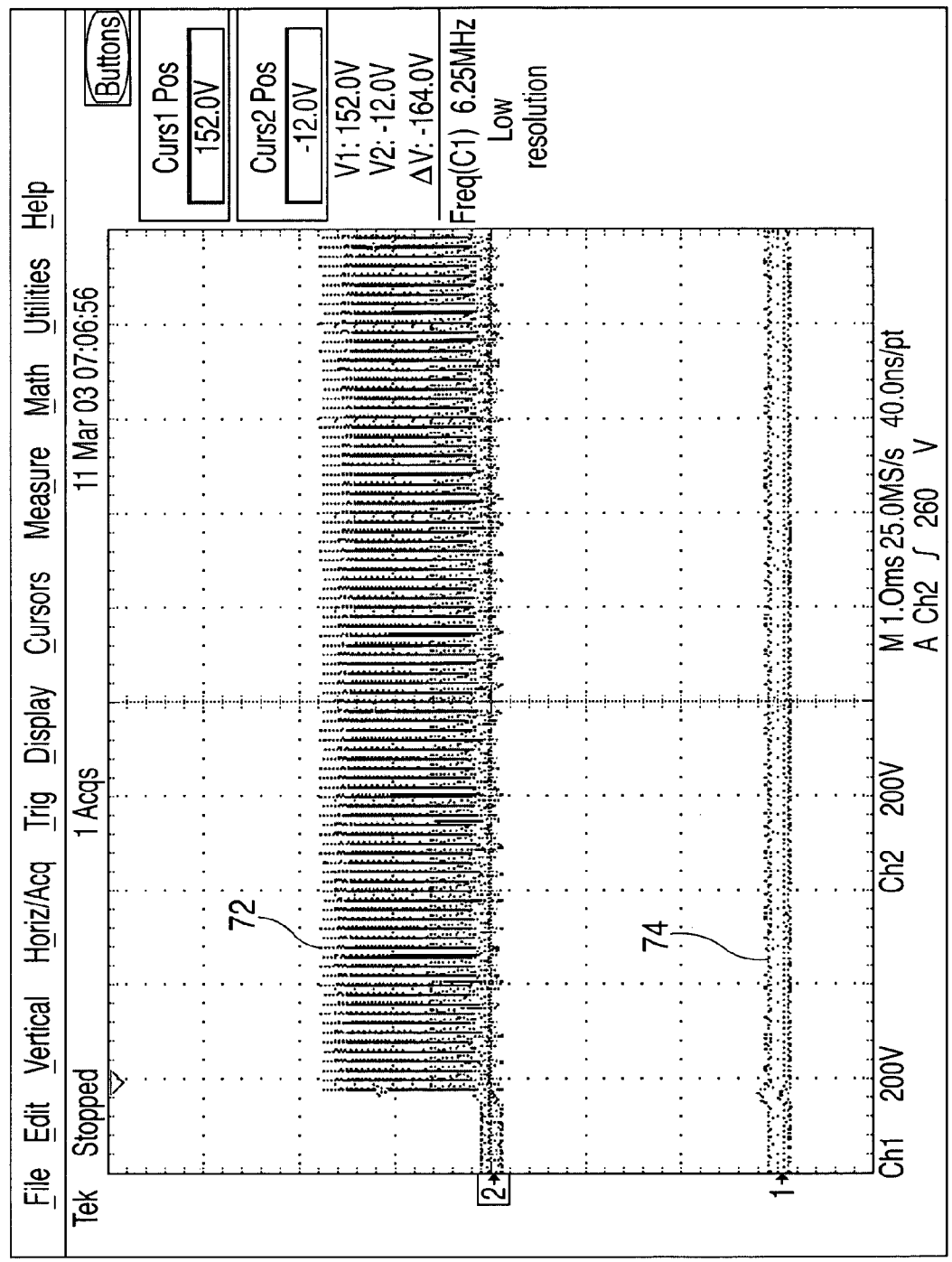
FIG. 4 is an oscilloscope plot illustrating no coupling of energy between driven and non-driven windings when the motor is disconnected.

Referring now to FIG. 4, an oscilloscope plot 70 shows probed outputs of the drive assembly or circuit 10 with no motor 12 connected thereto. A top or upper trace 72 of oscilloscope plot 70 corresponds with an active phase or driven phase winding, while a bottom or lower trace 74 corresponds with a sense phase or non-driven phase winding. The lower trace 74 corresponds with de-energized windings 40 used to determine presence of energy coupling with the driven windings. Low impedance sensing nets corresponding with voltage divider 22 allow this sensing to work well. No energy is seen with respect to bottom trace 74, as there can be no electromagnetic coupling between a driven phase winding and adjacent non-driven windings when motor 12 is not connected or has faulty motor cables connecting the drive assembly.

Figure 5:
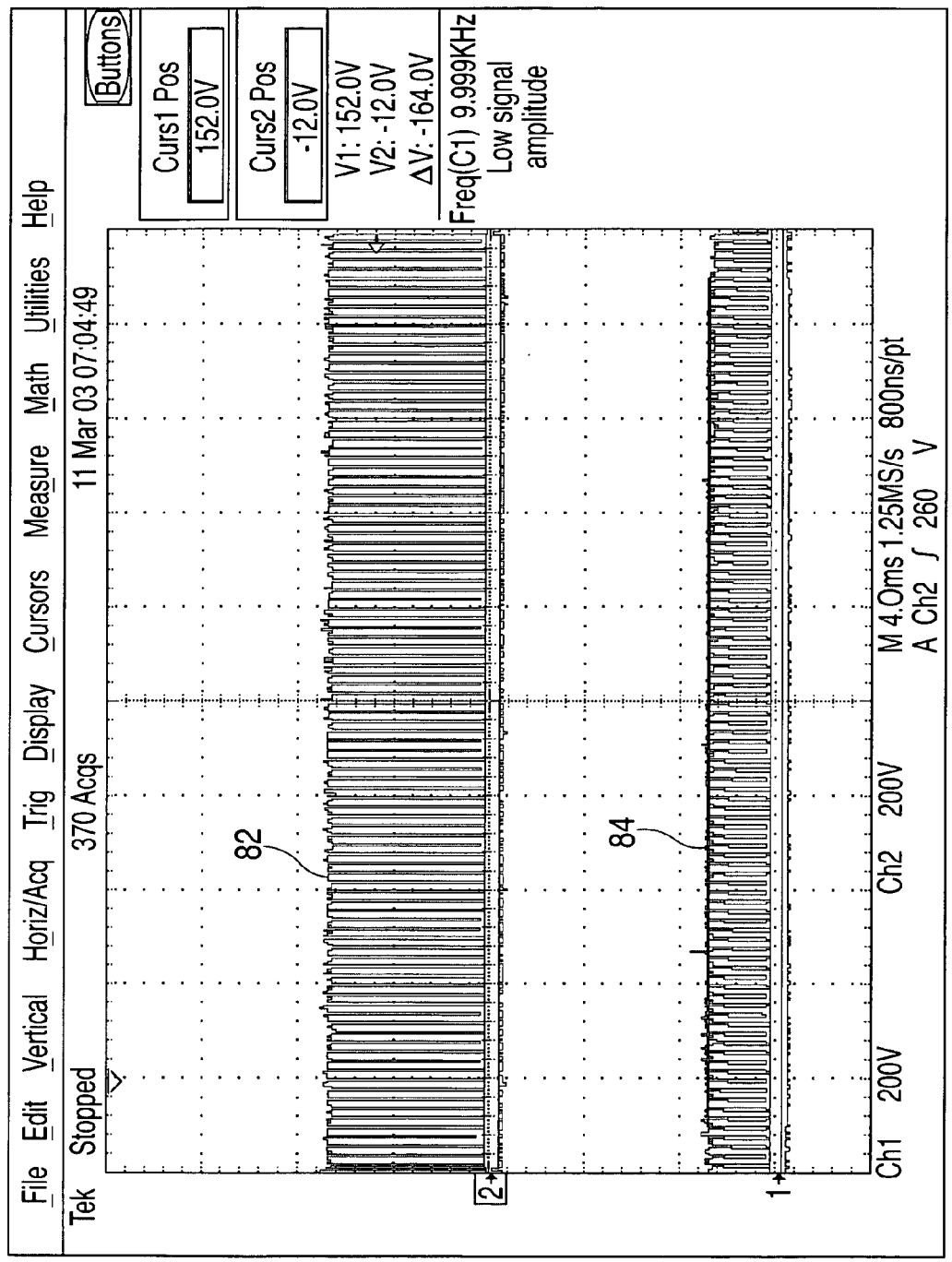
FIG. 5 is an oscilloscope plot illustrating significant energy coupling between driven and non-driven windings when the motor is connected.

Referring to FIG. 5, an oscilloscope plot 80 shows probed outputs of the drive assembly with motor 12 operably connected thereto. More specifically, plot 80 is of two adjacent phases with respect to ground (the same way back-EMF is sensed). The top or upper trace 82 of oscilloscope plot 80 corresponds with an active phase or driven phase winding with 350 VDC peaks, while a bottom or lower trace 84 corresponds with a sense phase or non-driven phase winding with 150 VDC peaks. A signal is clearly visible with respect to bottom trace 84 compared to bottom trace 74 of plot 70. Plot 80 indicates that motor 12 is plugged, as there is significant electromagnetic energy coupling between the driven and non-driven phases as observed on the lower trace 84.

It should be known that many hundreds of detection cycles are shown in plots 70 and 80, while it takes only one pulse to detect whether motor 12 is connected. Repetitive pulsing in plots 70 and 80 was used to demonstrate repeatability and to show that the motor winding current is discontinuous, with a duty cycle less than or equal to 50% such that the motor winding current in a driven phase winding always decays to zero during detection pulses. However, it will be recognized that it is also contemplated that a detection duty cycle can be greater than 50% such that a motor winding current in a driven phase winding never decays to zero and accumulates over successive detection pulses. In addition, it will be recognized that the repetitive pulsing is generated by activating two, three, up to all of the six inverter transistors Q1–Q6 to generate detection pulse signals to determine the presence of motor 12 or other load. Furthermore, the six inverter transistors Q1–Q6 may be enabled for a single pulse or a plurality of pulses for the purpose of detection of motor 12 or other connected load.

The above described invention uses the flux linkage of the motor components (i.e., rotor and stator) to determine if a motor is connected to a solid state motor control assembly without requiring significant energy to be delivered to the motor itself. Detection of electromagnetic energy coupling between windings of an electric motor determines whether a motor is connected or not. In particular, an exemplary embodiment in accordance with the invention relies on the close electromagnetic coupling of adjacent windings present in inverted sensorless BLDC motors. This allows for very low energy pulses to be delivered to windings in order to determine if a motor is present. These low energy pulses are very easy to detect using the existing sampling subsystem in the electronic motor controller. The proposed invention is designed to operate in a pure sensorless mode. It is for this reason that this invention enables users of sensorless motor controllers to have more reliable and faster motor plug detection without the addition of hardware. Unlike Time Domain Reflectometry, which is line parameter dependent, the above described system and method uses electromagnetic coupling from adjacent phases thereby eliminating the need for high accuracy timing measurement and eliminates the problems associated with sensor based detection and current drive detection discussed above. The ability to detect a motor not plugged as opposed to genuine start failures allows service personnel to quickly determine whether a motor needs to replaced or just plugged in.

It should be noted that the exemplary embodiments as disclosed herein provide for a sensorless or sensored motor controller and improved fault isolation means over existing designs. This is desirable in all applications, and may actually be critical in some application such as medical instrumentation and disk storage systems. In particular, a sensorless BLDC motor is the motor of choice for high power blowers and fans associated cooling critical components, most particularly associated with computers. Moreover, the invention is readily applicable to all motor and motor controller types including, but not limited to, DC, AC, Brush, and Brushless.

It will be appreciated, that the controller functionality described herein is for illustrative purposes. The processing performed throughout the system may be distributed in a variety of manners. For example, distributing the processing performed in the controller 20 among the other controllers, and/or processes employed may eliminate a need for such a component or process as described. Each of the elements of the systems described herein may have additional functionality as described in more detail herein as well as include functionality and processing ancillary to the disclosed embodiments. As used herein, signal connections may physically take any form capable of transferring a signal, including, but not limited to, electrical, optical, or radio.

The system and methodology described in the numerous embodiments hereinbefore provides a robust means to improve fault isolation of a motor with detection of electromagnetic energy coupling with non-driven phase windings. In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method to determine the presence of a brushless DC (BLDC) motor connected to an electronic control circuit, the electronic control circuit operative to control the BLDC motor having one or more magnetic components, the method comprising:

generating a pulse signal to a selected driven phase winding through at least four inverter transistors configured within the electronic control circuit; and detecting said pulse signal for the purpose of one of a signal presence and absence thereof at a non-driven phase winding as a result of said pulse signal, wherein presence of said signal at said non-driven phase winding is indicative of the motor connected to the electronic control circuit.

2. The method of claim 1, wherein absence of said signal at said non-driven phase winding is indicative of the electric machine lacking connection with time electronic control circuit.

3. The method of claim 1, wherein said generating said pulse signal includes an arbitrary sequence of pulses.

4. The method of claim 3, wherein the electronic control circuit is receptive to said arbitrary sequence of signals and feedback signals from the motor.

5. The method of claim 4, wherein the electronic control circuit is configured to determine signal presence or absence thereof at said non-driven phase winding.

6. The method of claim 1, wherein said generating said pulse signal includes one of a random sequence and a pseudo random sequence of pulses.

7. The method of claim 1, wherein said signal non-driven phase winding includes non-driven phase windings adjacent said driven phase winding.

8. The method of claim 1, further including:
activating only two of the at least four inverter transistors to generate pulse signals to determine the presence of the motor.

9. The method of claim 1, further including:
activating three of the at least four inverter transistors to generate pulses to determine the presence of the motor.

10. The method of claim 1, further including:
enabling all of the at least four inverter transistors for one of a single pulse and a plurality of pulses for the purpose of detection of one of the motor or a load.

11. The method of claim 1, wherein a detection duty cycle is less than 50% such that a current in said selected driven phase winding always decays to zero during said detecting said pulse.

12. The method of claim 1, wherein a detection duty cycle is greater than 50% such that a current in said selected driven phase winding never decays to zero and accumulates over successive sequences of said detecting said pulse.

13. A system to determine the presence of a brushless DC (BLDC) motor connected to an electronic control circuit, the electronic control circuit operative to control the BLDC motor having one or more magnetic components, comprising:

a stator having a plurality of phase windings; and the electronic control circuit configured to generate a pulse signal to a selected driven phase winding through at least four inverter transistors configured within the electronic control circuit, said pulse signal detected for the purpose of one of a signal presence and absence thereof at a non-driven phase winding as a result of said pulse signal, wherein presence of said signal at said non-driven phase winding is indicative of the motor connected to the electronic control circuit.

14. The system of claim 13, wherein absence of said signal at said non-driven phase winding is indicative of the electric machine lacking connection with the electronic control circuit.

15. The system of claim 13, wherein generating said pulse signal includes an arbitrary sequence of pulses.

16. The system of claim 15, wherein the electronic control circuit is receptive to said arbitrary sequence of signals and feedback signals from the motor.

17. The system of claim 16, wherein the electronic control circuit is configured to determine signal presence or absence thereof at said non-driven phase winding.

18. The system of claim 13, wherein generating said pulse signal includes one of a random sequence and a pseudo random sequence of pulses.

19. The system of claim 13, wherein said signal non-driven phase winding includes non-driven phase windings adjacent said driven phase winding.

20. The system of claim 13, wherein only two of the at least four inverter transistors are activated to generate pulse signals to determine the presence of the motor.

21. The system of claim 13, wherein three of the at least four inverter transistors are activated to generate pulses to determine the presence of the motor.

22. The system of claim 13, wherein all of the at least four inverter transistors are enabled for one of a single pulse and a plurality of pulses for the purpose of detection of one of the motor or a load.

23. The system of claim 13, wherein a detection duty cycle is less than 50% such that a current in said selected driven phase winding always decays to zero during said detecting said pulse.

24. The system of claim 13, wherein a detection duty cycle is greater than 50% such that a current in said selected driven phase winding never decays to zero and accumulates over successive sequences of said detecting said pulse.

25. A storage medium encoded with a machine-readable computer program code, said code including instructions for causing a computer to implement a method for determining the presence of a brushless DC (BLDC) motor connected to an electronic control circuit, the electronic control circuit operative to control the BLDC motor having one or more magnetic components, the method comprising:

generating a pulse signal to a selected driven phase winding through at least four inverter transistors configured within the electronic control circuit; and detecting said pulse signal for the purpose of one of a signal presence and absence thereof at a non-driven phase winding as a result of said pulse signal, wherein presence of said signal at said non-driven phase winding is indicative of the motor connected to the electronic control circuit.

* * * * *